United States Patent [19]
Vermillion

[11] Patent Number: 5,499,555
[45] Date of Patent: Mar. 19, 1996

[54] SKI SHARPENING GUIDE WITH FILE-SUPPORT PLATFORMS

[76] Inventor: James H. Vermillion, 14220 Orchard Ave., Caldwell, Id. 83605

[21] Appl. No.: 384,038

[22] Filed: Feb. 6, 1995

Related U.S. Application Data

[63] Continuation-in-part of Ser. No. 322,435, Oct. 13, 1994.

[51] Int. Cl.⁶ .............................. B23D 69/02; B24B 9/04
[52] U.S. Cl. ....................................... 76/83; 76/88
[58] Field of Search ...................... 76/82.1, 82.2, 76/82, 83, 88; 451/28, 45, 552, 558

[56] References Cited

U.S. PATENT DOCUMENTS

| | | | |
|---|---|---|---|
| 493,174 | 3/1893 | McClure | 76/83 |
| 1,196,399 | 8/1916 | Ryan | 76/83 |
| 2,032,640 | 3/1936 | Swetta et al. | 76/83 |
| 4,030,382 | 6/1977 | Nilsson et al. | 76/83 |
| 4,060,013 | 11/1977 | Thompson | 76/83 |
| 4,601,220 | 7/1986 | Yurick, Jr. | 76/83 |
| 4,663,993 | 5/1987 | Weinger et al. | 76/83 |
| 4,721,020 | 1/1988 | Stumpf | 76/83 |

*Primary Examiner*—Hwei-Siu Payer
*Attorney, Agent, or Firm*—Ken J. Pedersen; Barbara S. Pedersen

[57] ABSTRACT

Embodiments of a ski sharpening guide are shown and described, each embodiment including an angular member having a side surface for placement against a ski and a top surface for holding a file. Preferably, a channel runs along the junction between the side surface and the top surface along the entire length of the angular member, for collection of filings. Preferably, the top surface includes a filing-receiving recess having platforms that rise from the recess to have platform top surfaces that are co-planar with the angular member top surface. The platforms provide additional support for the file with minimal reduction of recess volume and efficiency of filings removal. The ski sharpening guide preferably includes a clamp for securing the file in position relative to the guide and the ski edge.

11 Claims, 4 Drawing Sheets

SKI SHARPENING GUIDE WITH FILE-SUPPORT PLATFORMS

BACKGROUND OF THE INVENTION

This application is a continuation-in-part of my prior co-pending application Ser. No. 08/322,435, filed Oct. 13, 1994, and entitled "SKI SHARPENING GUIDE", the disclosure of which is hereby incorporated by reference.

FIELD OF THE INVENTION

This invention relates generally to ski maintenance equipment. More specifically, this invention relates to hand-held guides that are used with a file, sharpening stone or other abrasive tool for sharpening the edges of snow skis.

RELATED ART

To optimize ski performance, skiers and technicians frequently sharpen the edges of snow skis. Smooth and sharp metal edges help give the ski a consistent and predictable "bite" into the snow, which is particularly important to down-hill skiers and racers. The sharpening procedure ideally creates a smooth, sharp edge that has an angle ranging between about 83° to 90°, depending on the skier's preference.

Stumpf (U.S. Pat. No. 4,721,020) discloses a ski sharpening guide, which is shown in FIG. 1. The Stumpf guide is an angle member which rests on its outer vertical surface against the base of a ski. A file rests on the outer, upper surface of the angle member so that the file extends over the metal ski edge. The file and angle member are held together by the user's hand and slid back and forth longitudinally along the ski, so that the ski edge is filed.

In Stumpf, a chip-receiving recess or slot is provided in the upper surface of the angle member, and the file extends substantially over this chip-receiving recess so that filings tend to enter this recess. The Stumpf chip-receiving recess is narrow at its inlet at the vertical surface and grows wider further away from the ski.

Stumpf teaches that the junction between the upper surface of the guide and the vertical surface of the guide should be a sharp edge. Stumpf explains that this sharp junction prevents filings from building up near the junction and near the ski edge, and, thus, prevents the filings from interfering with the sharpening procedure and prevents filings from becoming imbedded in the plastic base of the ski.

Ski sharpening is done both in the controlled environment of ski and maintenance shops and also in the less convenient and controlled environment near the ski slopes. The sharpening is performed on equipment with a range of sophistication and value, and by individuals with a range of expertise. Therefore, what is needed is a hand-held ski sharpening guide that is easily-operated, inexpensive, light-weight, and easily packed, and yet one that is also accurate, precise, consistent, and durable.

SUMMARY OF THE INVENTION

An object of the present invention is to provide a ski sharpening system that is simple, inexpensive, and portable and yet that accomplishes high-quality sharpening of ski edges. Another object of the invention is to provide a ski sharpening guide that lessens the effect of the user's hand strength and dexterity, allowing the user to do a consistent and accurate sharpening job under a variety of conditions.

This invention is a ski sharpening guide that comprises an angular member having a generally and substantially horizontal outer, top surface for support of a file, sharpening stone or other abrasive tool, and a generally and substantially vertical, outer side surface for resting against the ski bottom or base. The top surface and side surfaces join at a junction so that they form two surface of the angular member that are preferably, but not necessarily, at about 90°–97° to each other. The invention further comprises a channel cut longitudinally along the junction, providing a gap preferably all along the junction, between the ski edge and the sharpening guide, for receiving filings from the sharpening procedure. Preferably, the guide also includes a filing-receiving recess cut into the top surface and extending from its inlet at the channel to its outlet near the rear edge of the top surface. The recess side walls may be angled so that the recess inlet is wider than the recess outlet.

Preferably, the guide also includes platforms that rise from the filing-receiving recess and that have top platform surfaces parallel to and even with the top surface of the angular member. The platforms increase support of the file while minimizing interference with the receiving of filings in the recess or the movement of filings away from the channel and toward the rear edge of the angular member.

The angular member preferably includes a wear plate with a flat, highly-polished and highly-durable surface, such as stainless steel. This wear plate provides an outer surface, which becomes the side surface for contacting the ski, that stays planar and smooth even after many uses.

The ski sharpening guide also preferably includes a clamp system, for securing a file in a desired position relative to the guide and therefore relative to the ski.

DETAILED DESCRIPTION OF THE PREFERRED EMBODIMENT

Figure 1:
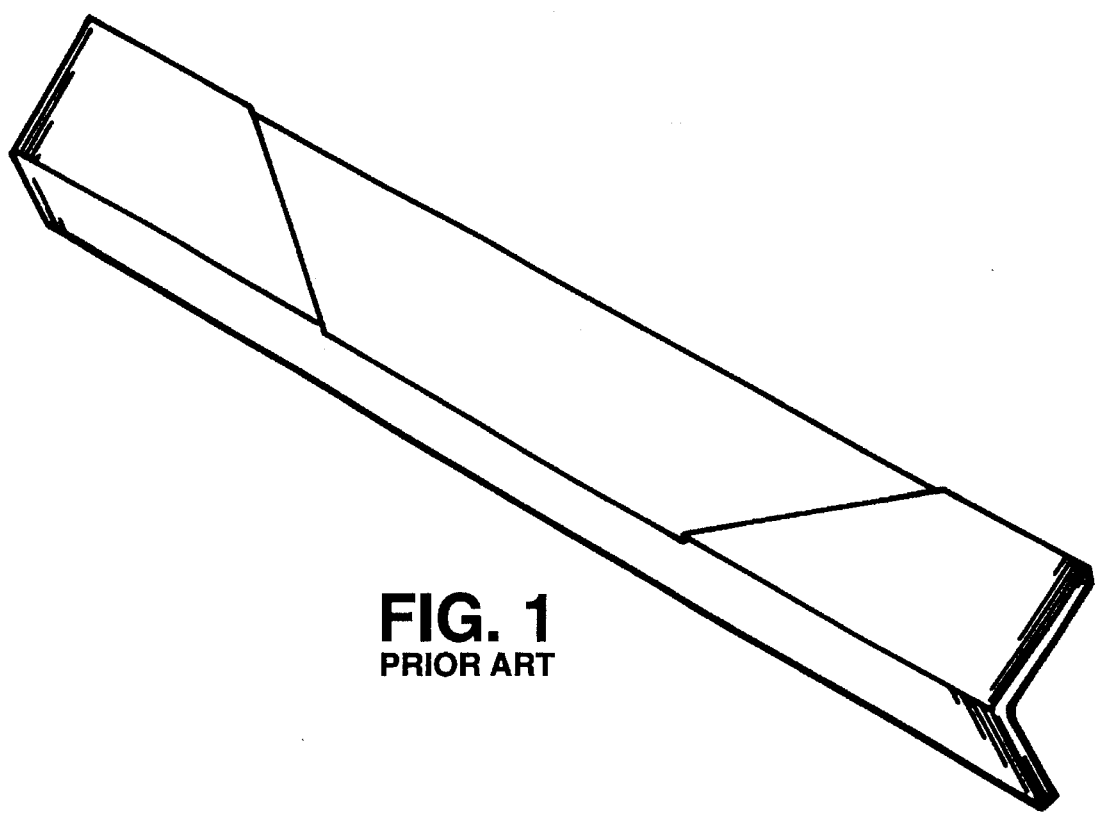
FIG. 1 is a front perspective view of a prior art ski sharpening guide.
Figure 2A:
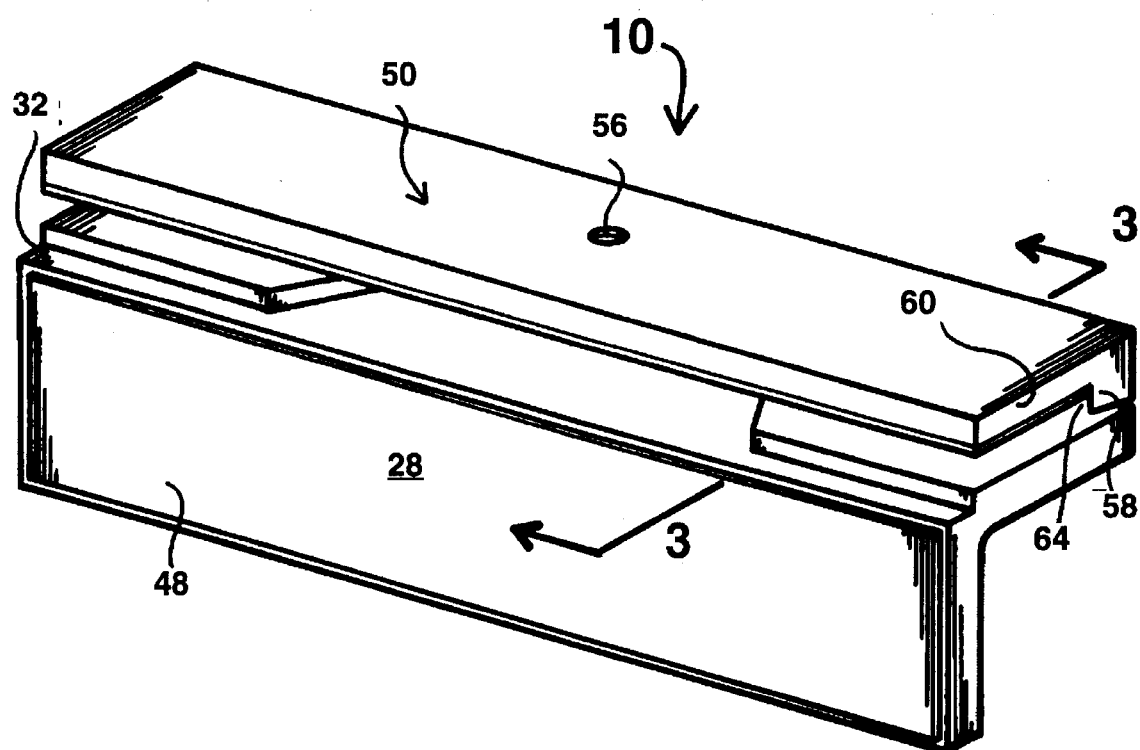
FIG. 2A is a front perspective view of one embodiment of the present invention, including a clamping system.
Figure 2B:
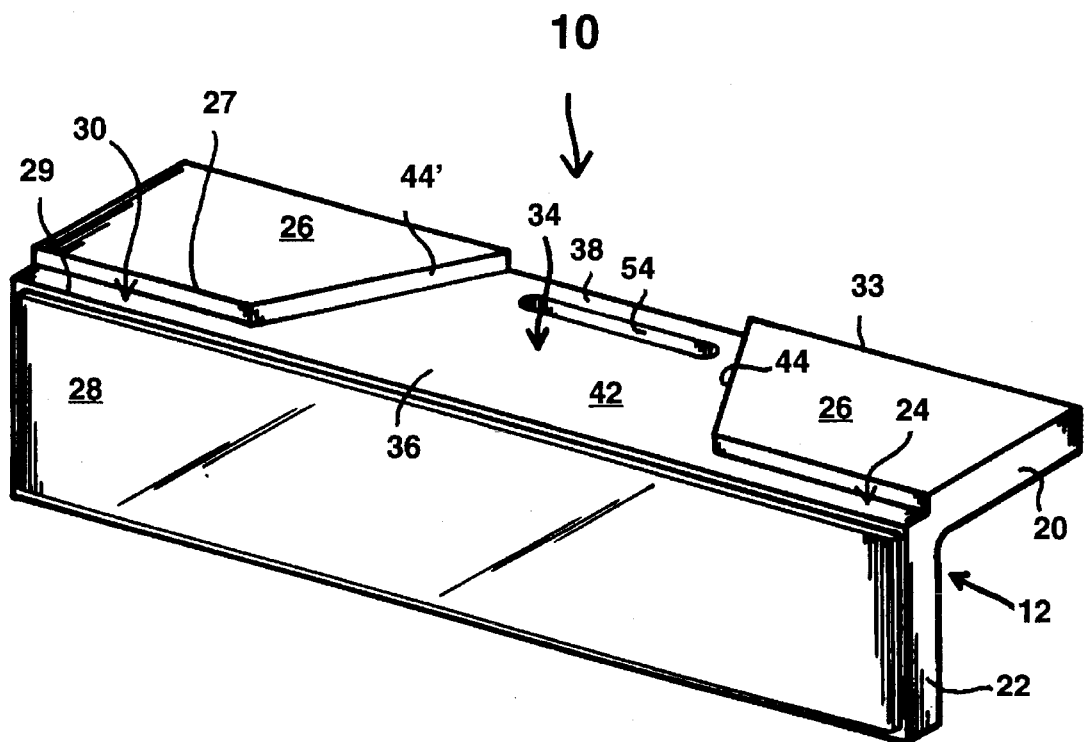
FIG. 2B is a front perspective view of the embodiment of FIG. 2A, with the clamp removed.

Referring to FIGS. 2–6, there are shown several, but not the only, embodiments of the invented ski sharpening guide 10, 70. The guide 10 includes an angular member 12 which is held against the base 14 of a ski 16. The angular member 12 is for supporting and guiding a file, sharpening stone or other abrasive tool 17 as the file 17 and the guide 10 are moved together, longitudinally along the ski 16, so that the file 17 sharpens the ski edge 18. The guide 10 preferably also includes a clamping system for securing the file 17 in place on the angular member 12, so that the file 17 is secured in a desired position relative to the ski edge 18 and to the user's hand.

The angular member 12 includes a support plate 20 and a guide plate 22, which are joined together at a junction 24 so that the outer, top surface 26 of the support plate 20 is positioned, preferably but not necessarily, at a guide angle of about 90°–97° to the outer, side surface 28 of the guide plate 22. The guide angle effects the angle at which the file 17 contacts the ski edge 18 and therefore the angle of the sharpened ski edge. Preferably, an embodiment of the guide 10 is produced for each angle that is desired by skiers. For example, a selection of eight guides 10, with guide angles ranging from 90° to 97° in 1 degree increments, would serve the majority of skiers. This selection of guides 10 would sharpen ski edges 18 to ski edge angles ranging from 90° to 83°.

At the junction 24, where the front edge 27 of the top surface 26 meets or would meet the upper edge 29 of the side surface 28, there is cut a channel 30 preferably running longitudinally along the entire length of the angular member 12 and the entire length of the junction 24. This channel 30 serves to put a gap between the ski edge 18 and the angular member 12, so that the filings from the sharpening procedure will rest in the channel 30 instead of being wedged and rubbed between the ski edge 18 and the angular member 12. Preferably, the bottom wall 32 of the channel 30 is horizontal or slightly slanted downward away from the ski 16, so that filings tend to stay away from the ski and instead tend to move back toward the rear edge 33 of the top surface 26. The channel 30 is typically less than about ¼ inch deep and less than about ¼ inch wide, and preferably about ⅙ inch deep and ⅛ inch wide, purposely creating room for filings but not creating such a deep or wide gap that the guide plate 22 wobbles when it is moved along the ski 16 or that the file 17 wobbles in its position on the support plate 20.

In addition, the guide 10 design includes a filing-receiving recess 34 cut into the top surface 26 of the support plate 20. This recess 34 extends from its inlet 36 at the channel 30, across the support plate 20 to its outlet 38 at the rear edge 33. The recess 34 is defined by its recess bottom surface 42, and its first and second side walls 44 and 44'. The recess side walls 44, 44' are angled from the inlet 36 to the outlet 38, so that the inlet 36 is larger, or wider, than the outlet 38. This wide-inlet design of the angled recess 34 creates a wide, open inlet into which the filings may move away from the ski 16 and ski edge 18. Thus, the filings tend to fall down from the file 17 and from the ski edge 18 into the channel 30, so that the filings are removed from the areas of contact between file 17 and edge 18 and between side surface 28 and ski 16. Then, the filings tend to move, due to the movement of the guide, from the channel 30 through the wide inlet 36, into the recess 34, and back toward the outlet 38. Preferably, the channel 30 and the recess 34 are the same depth, so that no ridge or other barrier exists between the channel 30 and the recess bottom surface 42 to prevent easy movement of filings from the channel 30 to the recess 34.

Figure 6:
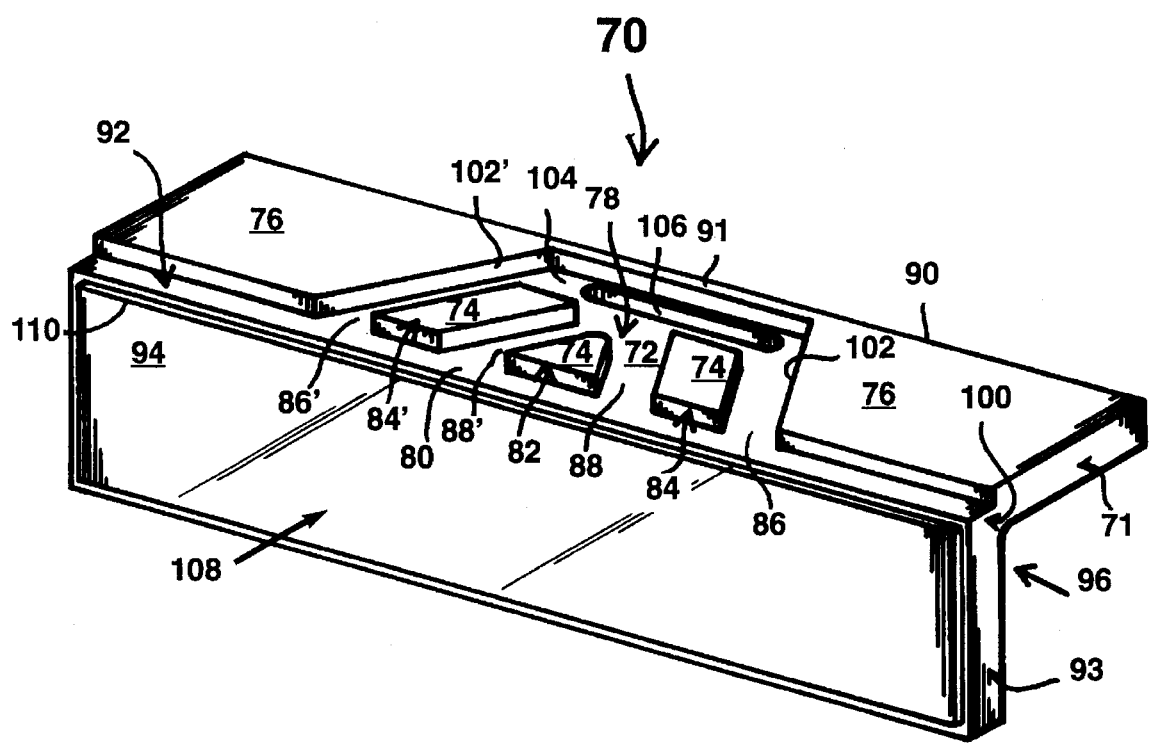
FIG. 6 is a front perspective view of the new preferred embodiment of the invention, including platforms rising from the recess bottom surface.

In the new preferred embodiment of FIG. 6, the guide 70 support plate 71 has platforms that rise or upend from the recess bottom surface 72. The platforms have top platform surfaces 74 that are co-planar with the support plate top surface 76 and that provide additional support underneath the file or other abrasive tool 17. This additional support prevents bowing of the file 17 down into the recess 78. This additional support also prevents tipping of the file 17 down into the recess 78 when the file 17 is held at a greater angle to the ski, that is, closer to perpendicular to the ski, and the file extends substantially over the recess inlet 80.

The platforms in FIG. 6 are a central, generally triangular platform 82 and two side platforms 84, 84' of generally parallelogram shape. The three platforms 82, 84, 84' generally divide the recess 78, in effect, into four recess channels 86, 86', 88, 88', which extend back and converge toward each other. In the embodiment of FIG. 6, the recess 78 extends to near, but not all the way to, the rear edge 90. A rear ridge 91, with a ridge top surface co-planar with the top surface 76 or that may be considered to be part of the top surface 76, lies along the rear edge 90 and provides strength to the support plate 71 and support for the file 17 when the file is at a greater angle to the ski.

In other words, the embodiment of FIG. 6 may be described as having a support plate 71 that has a plurality of filing-receiving recess channels 86, 86', 88, 88' cut into the top surface 76 to create the file-receiving recess 78. Alternatively, the recess channels 86, 86', 88, 88' may lie at angles other than those shown in FIG. 6 and may cover an area of the support plate 71 other than the trapezoid-shaped area in FIG. 6 created by the wide inlet and narrower outlet of the recess 78. For example, the recess channels 86, 86', 88, 88' may be parallel to each other and extend perpendicularly from the channel 92 back toward the rear edge 90, covering a generally rectangular area of the support plate 71. Thus, the platforms may be other shapes than the triangular platform 82 and parallelogram platforms 84, 84', for example, a rectangular, square, or round shape.

The guide 10, 70 designs provide a large area and volume, comprising the channel 30, 92 and recess 34, 78 (or recess channels 86, 86', 88, 88') for the filings to gather safely away from the ski 18. However, top surface 26, 76, and platform top surfaces 74 are sized to create a sufficient surface area to stably support the file 17. Preferably, the support plate 20, 71 is designed so that cutting the recess 34, 78 into the support plate reduces, by less than 50%, the area of top surface 26, 76 that is actually available for contacting the file 17. In the preferred embodiment of FIG. 6, the top surface 76 area is reduced by preferably less than about 30% by cutting the recess channels 86, 86', 88, 88' into the top surface 76. Also, the channel 30, 92 is sized so that cutting the channel into the guide plate 22, 93 reduces by less than about 20% the area of side surface 28, 94 that is actually available for contacting the ski 16 to keep the angular member 12, 96 stable as it moves longitudinally along the ski 16.

The preferred channel 30, 92 extends along the entire length of the junction 24, 100 and the angular member 12, 96 to provide more channel volume and length for receiving filings and to allow filings to fall out of the channel ends. Alternatively, the invention includes any channel 30, 92 that extends longitudinally along the junction of the angular member 12, 96 and that is longer than the recess inlet 36, 80 is wide, so that the channel 30, 92 extends beyond the recess side walls 44, 44', 102, 102'.

The angle of the recess first and second side walls 44, 44, 102, 102' makes the side walls run generally perpendicular to the longitudinal axis of the file 17, placing a large portion of the top surface 26, 76 squarely underneath the file 17. The configuration of angled walls 44, 44' extending all the way across the support plate 20, provides excellent support for the file 17 when the file 17 is at a variety of angles. Alternatively, as in the embodiment of FIG. 6, the recess 78 may extend only partly across the support plate 71 (i.e., extend from the channel 92 part of the way to the rear edge 90 to be near the rear edge 90) and ends at its rear end or "recess outlet" 104 at the rear ridge 91. Because of the presence of the rear ridge 91, filings normally do not fall off the support plate over the rear edge 90, but this has little or no effect on filings removal or the sharpening procedure. If a build-up of filings occurs in the recess, the filings can fall through the slot 106, which is for connection of an optional clamping system, or can be quickly shaken off of the guide 70.

Preferably, the guide plate 22, 93 includes a wear plate 48, 108. The smooth, hard, machined outer surface of the wear plate 48, 108 contacts the ski 16, thus becoming the side surface 28, 94. This wear plate 48, 108 is preferably made of stainless steel or other material that may be made smooth, flat, and planar, and that is extremely durable. The combination of smoothness and durability is critical, because any grooves, wear-marks, or unevenness in the side surface 28, 94 can interfere with consistent and accurate ski sharpening. Preferably, the wear plate 48, 108 is about 1/32 inch thick and extends up to be either flush with or just below the channel 30, 92. This combination of thinness and position prevent there from being a pocket above the wear plate edge 49, 110 large enough to catch and hold filings.

Figure 3:
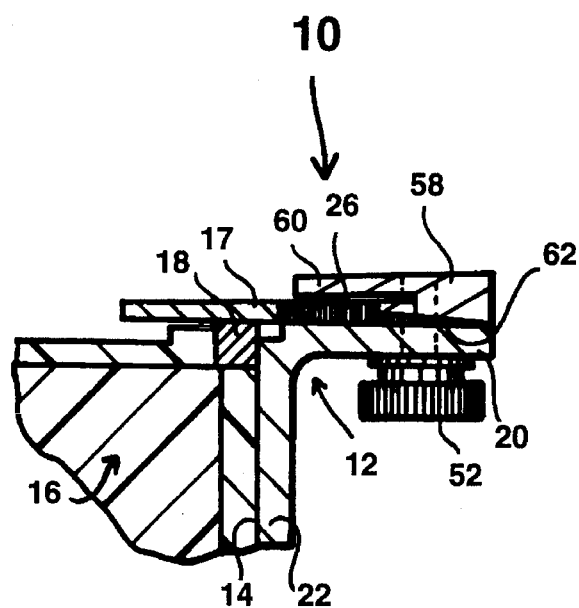
FIG. 3 is an end view of the embodiment of FIG. 2A, installed against a ski and holding a file.
Figure 4:
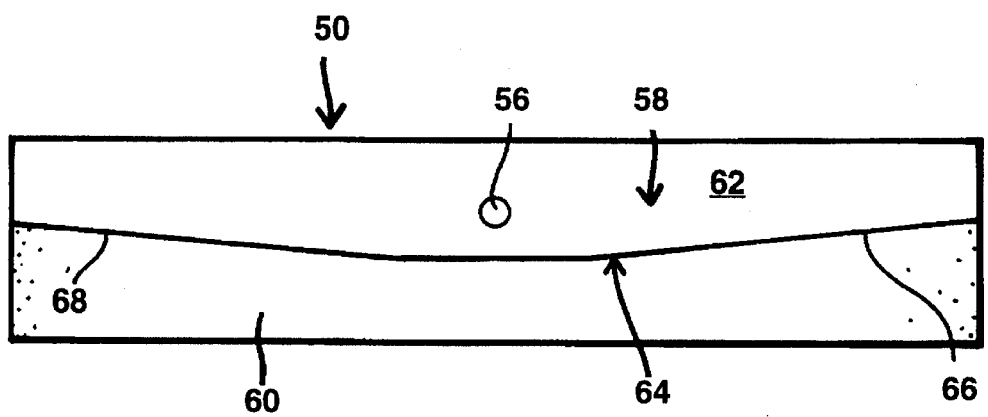
FIG. 4 is a bottom side view of the clamp member of FIG. 2A.

The guide 10, 70 optionally may include a clamping system, such as the embodiment illustrated in FIGS. 2A, 3–5. The clamping system comprises a clamp 50, and a threaded bolt 52, or other attachment means, for securing the clamp 50 to the angular member 12. The bolt 52 passes through a slot 54 in the support plate 20 and screws into the threaded hole 56 in the clamp 50. As shown in FIGS. 3 and 4, the clamp 50 includes a base 58 and a gripping plate 60. The base 58 bottom surface 62 rests on the top surface 26, and the gripping plate 60 contacts and grips the file 17 when the clamp 50 is tightened down. The bottom surface 62 is slightly slanted, so that, when the clamp 50 is tightened, the gripping plate 60 is forced down on the file 17 at a slight angle to improve the grip on the file 17. Also, the gripping plate 60 may be lined with a sheet of rubber or other gripping material.

Figure 5:
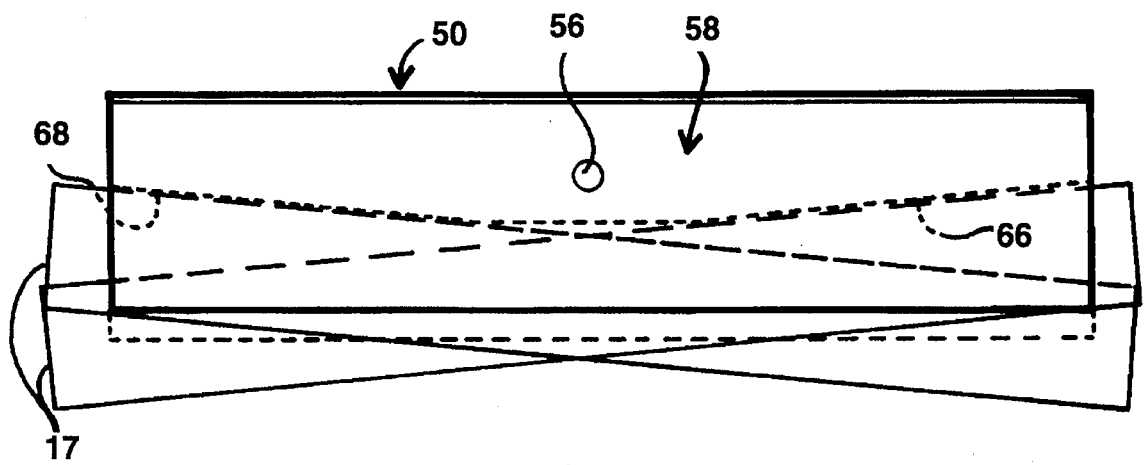
FIG. 5 is a schematic top view of the embodiment of 2A, showing the range of angles in which the file is preferably held by the clamping system.

The base side wall 64 of the base 58 is curved, as shown in FIG. 4, to act as a limit and a positioner against which the file 17 may be placed. The clamp 50 makes the file-guide combination a more secure unit, and the base side wall 64 prevents the file from being pushed away from the ski edge 18 toward the read edge 33. FIG. 5 illustrates the range of positions of the file 17, from alignment against the first end 66 of the base side wall 64 to alignment against the second end 68 of the base side wall 64. The angles of the first and second ends 66, 68 of the base side walls 64 may be other than those shown in FIG. 5, for example, to increase the angle at which the file may be positioned relative to the ski. The preferred embodiment of FIG. 6 is especially compatible with a clamp having a more angled base side wall, because the platforms 82, 84, 84' provide additional support for holding the file at greater angles.

The guide 10, 70 is preferably made of steel and/or stainless steel, or other material resistant to warping, cracking, or wear. Preferably the side surface 28, 94 and the top surface 26, 76 are both machined to ensure a very precise guide angles for excellent and consistent sharpening.

The embodiments shown in the Figures are approximately 5 inches long, with the support plate 20, 71 and guide plate 22, 93 each being about 1.25 inch across. The recess 34 is centered on the top surface 26, is about 1/16 inch deep, and is about 2.75 inches wide at the inlet 36 and about 1.5 inches wide at the outlet 38. Recess 78 is preferably, but not necessarily, about 1/16 inch deep, 2.75 inches wide at the inlet 80, and 1.75 inches wide at the outlet 104. Platforms 84, 84' are preferably about 5/16 inches wide and 0.5 inches long and platform 82 is preferably about 3/8 inches on each side.

In this description and in the claims, the term "file" means also sharpening stone or other abrasive tool. And, in this description and in the claims, the term "angular member" means that the member has two outer surfaces, the top surface and the (front) side surface, that lie in planes that are at an angle to each other, for example, at about 90°–97° to each other. This term, however, does not mean that the angular member must be L-shaped, but rather may have a variety of shapes of its bottom side and rear side surface (that is, the surfaces away from ski and file), including a handle or other extension.

In this description and in the claims, the terms "substantially horizontal" and "substantially vertical" mean that the top surface and side surface, respectively, are horizontal enough to effectively support a file and vertical enough to effectively act as a guide for movement along the ski bottom, respectively. These terms, however, do not mean that the top surface and side surface must be at 90° to each other, but includes a range of angles appropriate for ski sharpening. These terms, also, do not eliminate texture, curvature, or other shaping of the surfaces, as long as these surface variations do not interfere with steady support of the file or the steady movement of the guide along the ski.

In this description and in the claims, referring to the recess outlet 38, 104 as being "near" the rear edge 33, 90 means that the recess 34, 78 may extend all the way to the rear edge 33, 90 or, alternatively, may extend toward but not all the way to the rear edge 33, 90.

In this description and in the claims, the channel 30, 92 and recess 34, 78 (or channels 86, 86', 88, 88') are described as "cut" into the angular member. The term "cut" includes all forms of cutting, pressing, molding, or any way of forming such a channel or recess shape.

Although this invention has been described above with reference to particular means, materials, dimensions, and embodiments, it is to be understood that the invention is not limited to these disclosed particulars, but extends instead to all equivalents within the scope of the following claims.

I claim:

1. A ski sharpening guide for use with a file for sharpening edges of skis, the guide comprising an angular member comprising:

a generally horizontal outer top surface having a front edge and an opposing rear edge and a generally vertical outer side surface having an upper edge, the front edge of the top surface being connected to the upper edge of the side surface at a junction, a channel cut into the top surface and the side surface at the said junction and extending horizontally along the said junction, a recess cut into the top surface extending from the channel to near the rear edge, the recess being defined by a bottom surface and first and second side walls, the recess having an inlet at the channel and an outlet near the rear edge, and a platform upending from the recess bottom surface and having a platform top surface co-planar with the said angular member top surface, wherein the angular member top surface and the platform top surface are for supporting the file, the side surface is for placement against and moving against the ski, and the channel and recess are for collecting filings that drop from the file and ski edge.

2. A ski sharpening guide as set forth in claim 1, wherein the angular member comprises a plurality of platforms upending from the recess bottom surface and each platform having a platform top surface co-planar with the said angular member top surface.

3. A ski sharpening guide as set forth in claim 1, wherein the channel extends along the entire length of said junction.

4. A ski sharpening guide as set forth in claim 1, further comprising a clamping system comprising:

a clamp for placement over and contact with the file when the file is lying on the angular member top surface and the platform top surface; and an attachment means connecting the clamp to the angular member and causing the clamp to securely hold the file on the said top surfaces of the angular member and platform.

5. A ski sharpening guide as set forth in claim 4, wherein the clamp comprises:

a base having a bottom surface for resting on the top surface of the angular member and a base side wall facing toward the front edge of the top surface, and a gripping plate extending from the base for extending over and exerting pressure on the file, whereby the file is pushed against the base side wall and the base side wall prevents the file from being pushed past the base toward the rear edge.

6. A ski sharpening guide as set forth in claim 1, wherein the angular member further comprises a wear plate attached to the side surface, the wear plate having a machined wear plate outer surface for contacting the ski.

7. A ski sharpening guide for use with a file for sharpening edges of skis, the guide comprising an angular member comprising:

a generally horizontal outer top surface having a front edge and an opposing rear edge and a generally vertical outer side surface having an upper edge, the front edge of the top surface being connected to the upper edge of the side surface at a junction, a recess cut into the top surface extending from the junction to near the rear edge, the recess being defined by a bottom surface and first and second side walls, and the recess having an inlet at the junction and an outlet near the rear edge, a platform upending from the recess bottom surface and having a platform top surface co-planar with the said angular member top surface, wherein the angular member top surface and platform top surface are for supporting the file, the side surface is for placement and moving against the ski, and the recess is for collecting filings that drop from the file and ski edge.

8. A ski sharpening guide as set forth in claim 1, wherein the angular member comprises a plurality of platforms upending from the recess bottom surface and each platform having a platform top surface co-planar with the said angular member top surface.

9. A ski sharpening guide as set forth in claim 1, further comprising a clamping system comprising:

a clamp for placement over and contact with the file when the file is lying on the angular member top surface and the platform top surface; and an attachment means connecting the clamp to the angular member and causing the clamp to securely hold the file on the said top surfaces of the angular member and platform.

10. A ski sharpening guide as set forth in claim 9, wherein the clamp comprises:

a base having a bottom surface for resting on the top surface of the angular member and a base side wall facing toward the front edge of the top surface, and a gripping plate extending from the base for extending over and exerting pressure on the file, whereby the file is pushed against the base side wall and the base side wall prevents the file from being pushed past the base toward the rear edge.

11. A ski sharpening guide as set forth in claim 1, wherein the angular member further comprises a wear plate attached to the side surface, the wear plate having a machined wear plate outer surface for contacting the ski.

* * * * *